US008225303B2

(12) United States Patent
Wagner et al.

(10) Patent No.: US 8,225,303 B2
(45) Date of Patent: Jul. 17, 2012

(54) SYSTEM AND METHOD FOR PROVIDING SOFTWARE UPGRADES

(75) Inventors: André Wagner, Sinsheim (DE); Andreas Poth, Weingorten (DE); Baré Said, St Leon (DE); Christoph Lübbe, Bruchsol (DE); Horst F. Schaude, Kraichtal (DE); Silke Storch, Rauenberg (DE); Tobias Brandl, Walldorf (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 1264 days.

(21) Appl. No.: 11/948,548

(22) Filed: Nov. 30, 2007

(65) Prior Publication Data

US 2009/0144721 A1    Jun. 4, 2009

(51) Int. Cl.
G06F 9/44 (2006.01)
G06F 7/00 (2006.01)

(52) U.S. Cl. ........ 717/172; 717/168; 717/171; 717/173; 707/607

(58) Field of Classification Search .......... None
See application file for complete search history.

(56) References Cited

U.S. PATENT DOCUMENTS

| | | | | | |
|---|---|---|---|---|---|
| 5,974,429 | A | * | 10/1999 | Strub et al. | 1/1 |
| 6,151,709 | A | * | 11/2000 | Winkel | 717/173 |
| 6,370,646 | B1 | * | 4/2002 | Goodman et al. | 713/100 |
| 6,904,593 | B1 | * | 6/2005 | Fong et al. | 717/171 |
| 7,171,661 | B1 | * | 1/2007 | Pinera et al. | 717/172 |
| 7,222,339 | B2 | * | 5/2007 | Rothman et al. | 717/168 |
| 7,512,941 | B2 | * | 3/2009 | Pan et al. | 717/173 |
| 7,729,286 | B2 | * | 6/2010 | Mishra | 370/254 |
| 7,735,078 | B1 | * | 6/2010 | Vaidya | 717/171 |
| 7,774,772 | B2 | * | 8/2010 | Tal et al. | 717/172 |
| 7,844,572 | B2 | * | 11/2010 | Walker et al. | 707/607 |
| 7,912,810 | B2 | * | 3/2011 | Wittmann et al. | 707/607 |
| 8,051,414 | B2 | * | 11/2011 | Stender et al. | 717/168 |
| 8,074,213 | B1 | * | 12/2011 | Holtz | 717/172 |
| 2003/0225927 | A1 | * | 12/2003 | Goodman et al. | 709/320 |
| 2004/0044703 | A1 | * | 3/2004 | Wildhagen et al. | 707/203 |
| 2004/0255286 | A1 | * | 12/2004 | Rothman et al. | 717/168 |
| 2005/0257215 | A1 | * | 11/2005 | Denby et al. | 717/172 |
| 2005/0257216 | A1 | * | 11/2005 | Cornell et al. | 717/177 |
| 2006/0130065 | A1 | * | 6/2006 | Chin et al. | 718/104 |
| 2006/0155773 | A1 | * | 7/2006 | Drouet et al. | 707/200 |
| 2007/0169080 | A1 | * | 7/2007 | Friedman | 717/168 |
| 2007/0185720 | A1 | * | 8/2007 | Eberlein et al. | 705/1 |
| 2008/0022292 | A1 | * | 1/2008 | Gibson | 719/328 |

OTHER PUBLICATIONS

Tudor Dumitra et al., "Toward Upgrades-as-a-Service in Distributed Systems", [Online], 2009, pp. 1-2, [Retrieved from Internet on May 13, 2012], <http://citeseerx.ist.psu.edu/viewdoc/download?doi=10.1.1.194.205&rep=rep1&type=pdf>.*

(Continued)

Primary Examiner — Thuy Dao
Assistant Examiner — Ziaul A Chowdhury
(74) Attorney, Agent, or Firm — Kenyon & Kenyon LLP

(57) ABSTRACT

A method and system provide a business scenario. The method includes executing a first deployment unit on a first application platform. The method includes replacing an original second deployment with an upgraded second deployment unit on an upgraded second application platform. The method includes executing the upgraded second deployment unit. The method including transmitting messages related to the business scenario over a communications link between the first deployment unit and the upgraded second deployment unit. The method includes storing master data related to the business scenario in a data storage.

17 Claims, 5 Drawing Sheets

OTHER PUBLICATIONS

John Dilley et al., "Globally distributed content delivery", [Online], 2002, pp. 48-58, [Retrieved from Internet on May 13, 2012], <http://repository.cmu.edu/cgi/viewcontent.cgi?article=2112&context=compsci>.*

Randy Saint, "Lessons Learned in Developing an International Planning Software System", [Online], 2002, pp. 1-10, [Retrieved from Internet on May 13, 2012], <http://citeseerx.ist.psu.edu/viewdoc/download?doi=10.1.1.199.7081&rep=rep1&type=pdf>.*

S. Srbljic, et al., "Service Development and Application Integration with Public Information System Mediator",[0nline], 2004, pp. 713-715, [Retrived from Internet on May 13, 2012], <http://ieeexplore.ieee.org/stamp/stamp.jsp?tp=&arnumber=1347029>.*

* cited by examiner

SYSTEM AND METHOD FOR PROVIDING SOFTWARE UPGRADES

BACKGROUND

Modern businesses utilize management and information technology to design, enact, control, and analyze operational business processes involving humans, organizations, applications, documents and other assets. Software may be provided to help with implementing and executing business processes.

Business processes may be implemented on an application platform as business scenarios. The application platform may include a plurality of deployment units and data. Each deployment unit, which are sets of application services, may provide functionality to users, for example, sales, finances, human resources, etc. Deployment units may interface with data to provide assigned functionalities.

The deployment units and data of the application platform may combine to provide one or more business scenarios to users. For example, business scenarios may include human resources administration, customer ordering and subsequent invoicing and other business functions.

The application platform may be upgraded to a new release application platform. The new release application platform may offer additional functionalities, as well as new deployment units. Each new deployment unit may offer additional functionalities in support of business scenarios offered by the application platform.

Each deployment unit may include customer-programmed add-ons to provide special functionality required by the customer. However, such add-ons are created and supported by the customer, and therefore not provided by a new deployment unit. Such add-ons may require migration to the new deployment unit before functioning correctly on the new application platform.

Previously, upgrading an application platform involved installing and executing a new application platform with associated deployment units and data. Thus, customer-programmed add-ons may cease executing correctly. Thus, customers may hesitate at upgrading to a new application platform, even when all deployment units are not associated with a customer-programmed add-on, and new functionality is provided by the new application platform are desirable.

Thus, a need exists to provide an incremental upgrade approach for an application platform and its associated deployment units.

DETAILED DESCRIPTION

An exemplary application platform facilitates the use of the operation of computer application software by providing hardware and software to support the computer application software. The exemplary application platform may include a number of deployment units, which are software program modules that provide a set of application services. A business scenario is comprised of the set of, or subset of, the application services on the application platform. The computer application software may also include add-ons. Add-ons are customized software programs or modules that provides customized functionality to the computer application. For example, an inventory control application may have a specific add-on for controlling inventory in a shoe store and a different add-on for controlling inventory in an automobile dealership.

Enterprises commonly upgrade their computer applications due to technological advances, shift in business direction and the like. When an enterprise desires to make such an upgrade, a new release application platform may be installed and executed on a second server, the second server may be separate from a first server executing an old release application platform. The new release application platform then executes in parallel with the old release application platform on the separate servers. The customer may select deployment units to upgrade, which are installed and executed on the new application platform. Old deployment units remain on the old application platform.

The customer may elect to upgrade deployment units at a desired time, after any add-on functionalities have been migrated to a corresponding upgraded deployment unit. This allows the customer to upgrade the application platform, and individually upgrade deployment units until all deployment units have been upgraded. The customer may also prioritize deployment units in upgrade order, first upgrading highly desired deployment units.

Figure 1A:
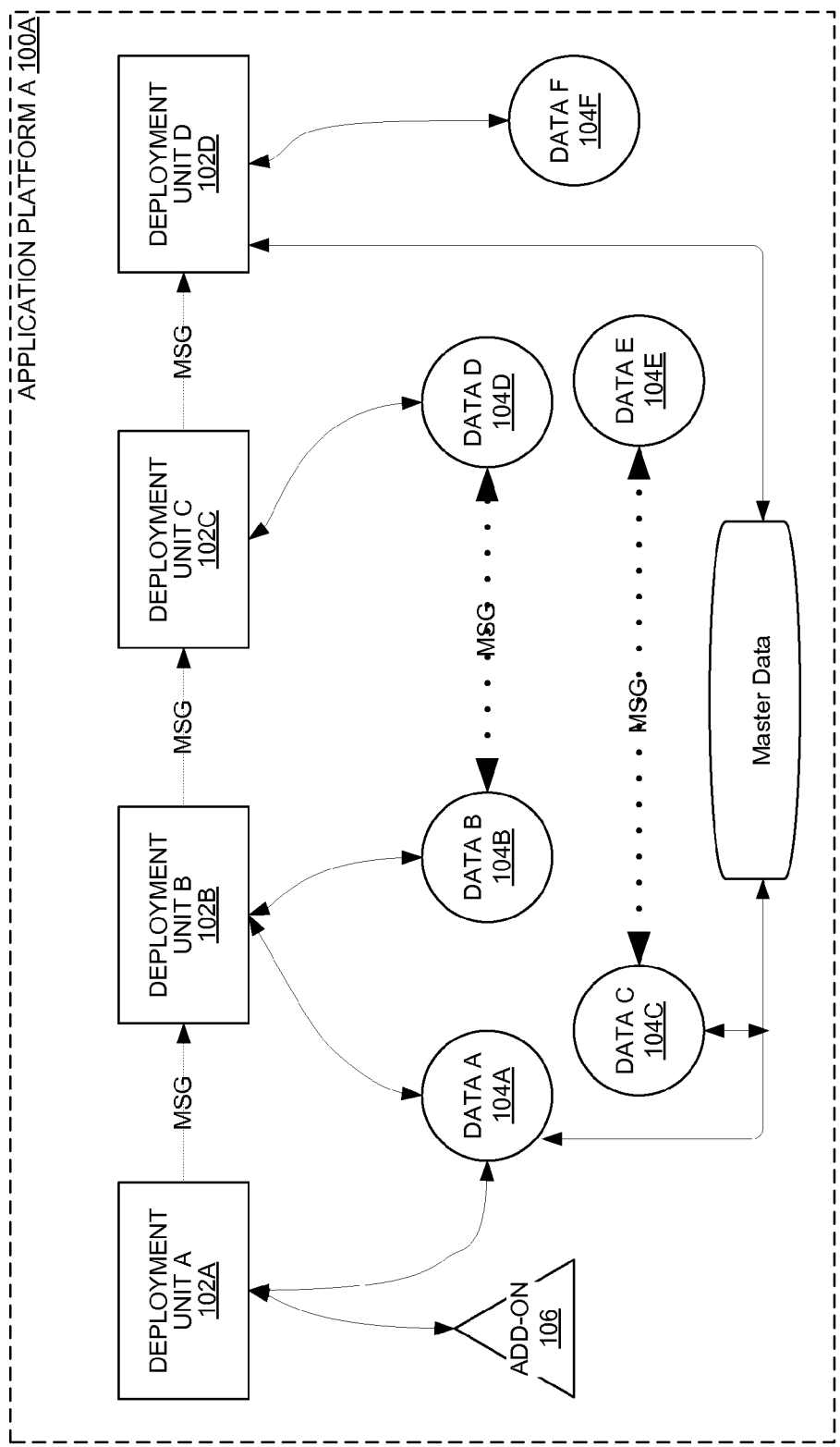
FIG. 1A depicts an example application platform before migration in accordance with an embodiment of the present invention.
Figure 2:
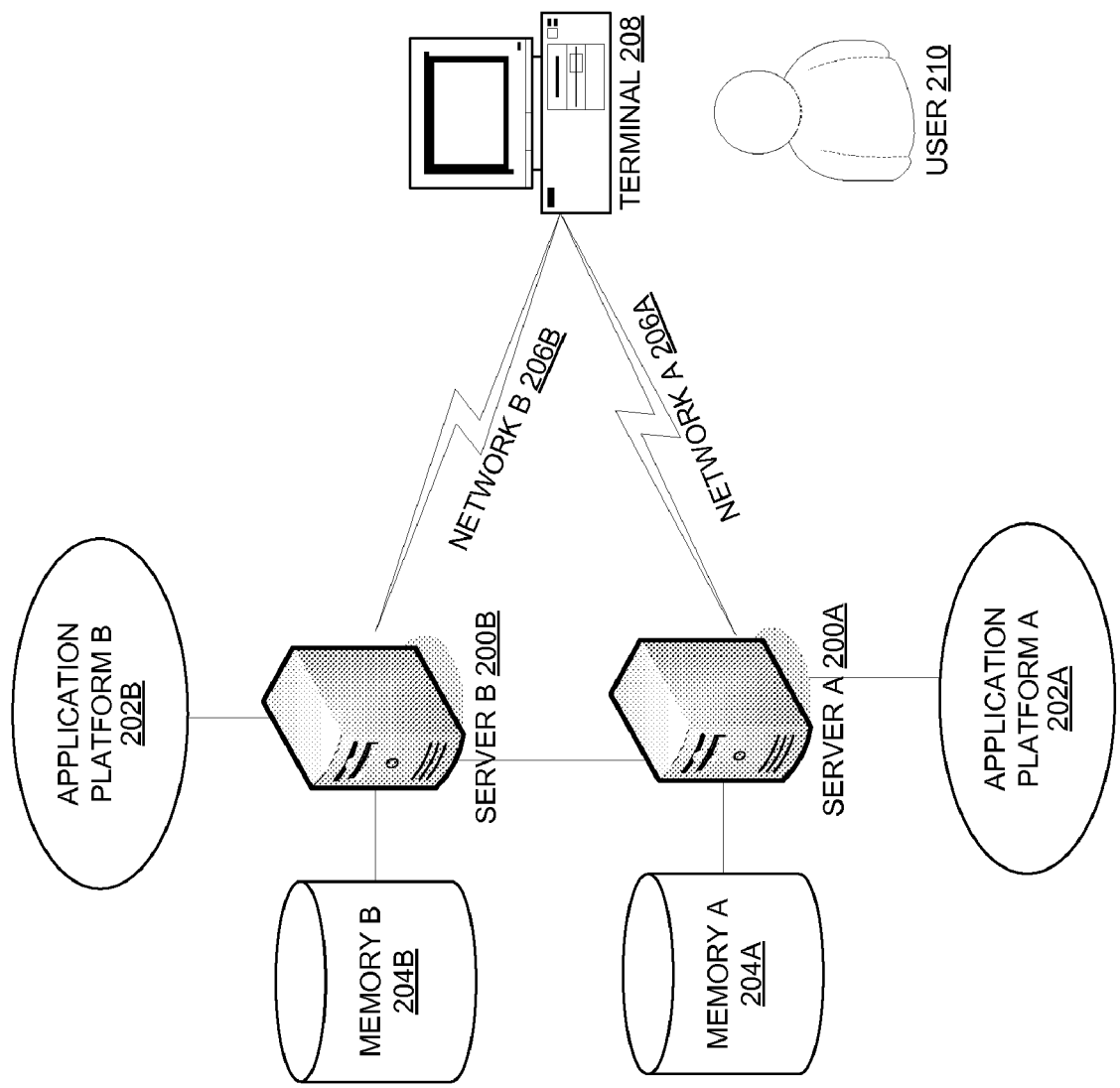
FIG. 2 depicts an example system for migrating an application platform in accordance with an embodiment of the present invention.

FIG. 1A depicts an example application platform before migration in accordance with an embodiment of the present invention. The application platform A 100A may execute on a server in a system as depicted in FIG. 2 and provide a business solution to an enterprise. The enterprise may be a customer implementing the application platform A 100A and include employees who are users of the system.

The application platform A 100A may include deployment unit A 102A, deployment unit B 102B, deployment unit C 102C, and deployment unit D 102D. The deployment units may communicate via messages (MSG shown in (dotted lines)) and be combined to provide business scenarios to users. Each business scenario may implement a business process as part of the business solution for the enterprise.

For example, a deployment unit may be invoicing, shipping, supply chain management, customer relation management, which provides, for example, order processing functionality. The deployment units may be combined to provide business scenarios such as selling items from inventory, human resource management, direct marketing, etc.

The application platform A 100A may include data, for example, data A 104A, data C 104B, data C 104C, data D 104D, data E 104E, and data F 104F, accessible by the deployment units. Each data may store data specifically used by a particular deployment unit, such as add-on 106 or deployment unit C102C related data, and be accessible to one or more deployment units. Related data may be dated used by more than one deployment unit, for example, data contained in data A 104A can be accessed by both deployment unit A102A and deployment unit B 102B. The data may also communicate via messages (MSG). Deployment unit specific data can be transformed and sent via messages to another deployment unit if the specific data is needed (e.g., sales order data can be sent to invoice processing) by transmitting data from, for example, data B 104B to data C 104C and data D 104D.

It will be appreciated that any number of deployment units, e.g., 1-50 or more, may be included with application platform A.

The application platform A 100A may include an add-on 106. A customer may program an add-on to be associated with any deployment unit, the add-on can be configured to provide additional functionality desired by the customer or its users. The add-on 106 may interface with other deployment units, such as 102B or 102D, and data, such as data A 104A via messages.

Figure 1B:
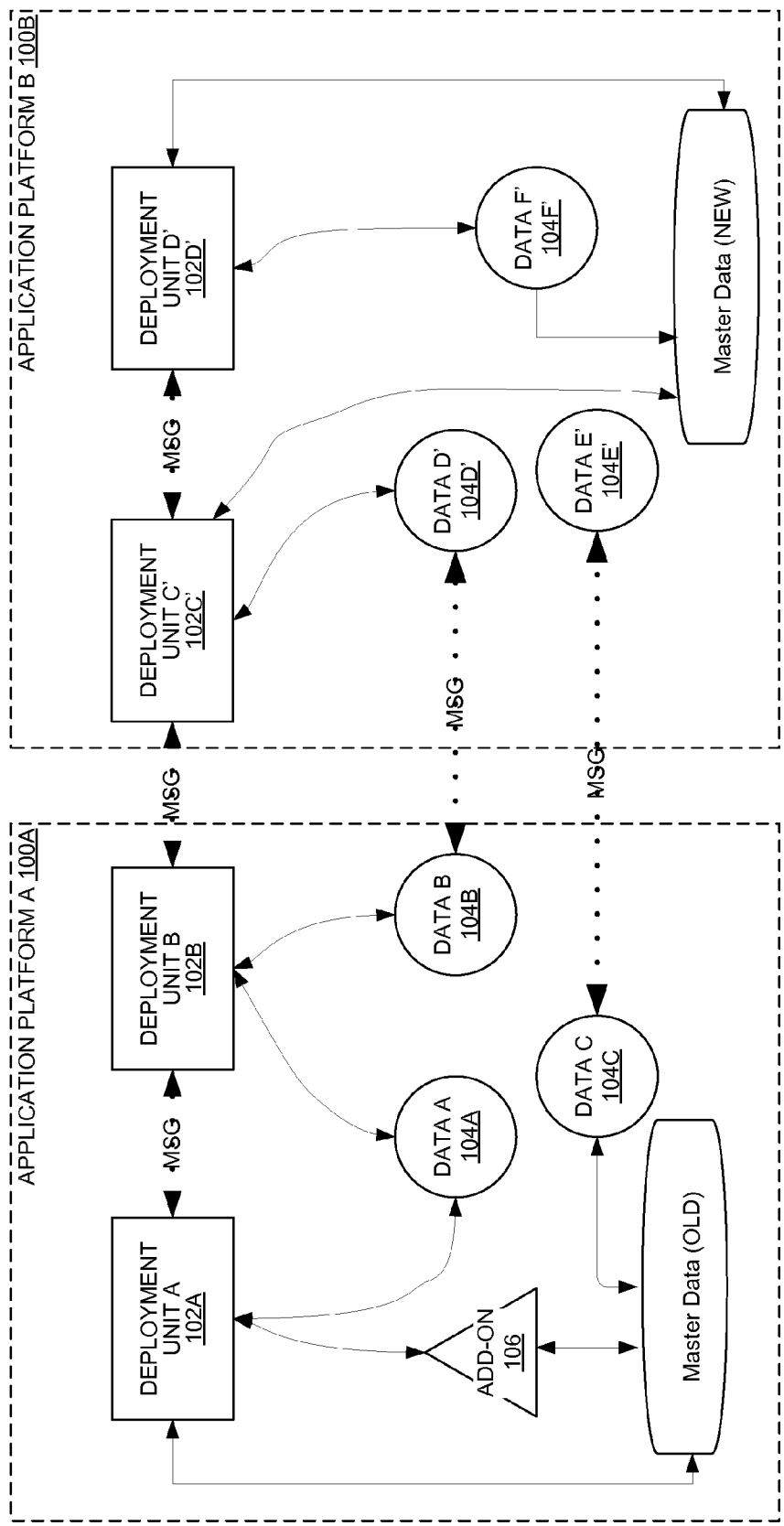
FIG. 1B depicts an example application platform during migration in accordance with an embodiment of the present invention.

FIG. 1B depicts an example application platform during migration in accordance with an embodiment of the present invention. FIG. 1B may be similar to FIG. 1A, except a new application platform B has been installed and is executing. The new application platform B may be a new release application platform and include additional functionality compared to application platform A 100A.

The application platform B 100B may include new deployment unit C' 102C' and deployment unit D' 102D'. The deployment unit C' 102C' may replace the deployment unit C 102C of FIG. 1A and provide additional functionality and/or features (e.g., data security enhancements, larger selection buttons, pull-down menus and the like). The deployment unit D' 102D' may replace the deployment unit D 102D of FIG. 1A and may provide additional functionality and/or features.

As part of the migration, master data is replicated to the new application platform B 100B. Master data is data that is required by an application platform, either 100A or 100B, to operate properly.

Master data (old) can be synchronized with master data (new) as the upgrade from the old AP A100A to new AP B100B progresses. The synchronization can occur periodically after each save or on some other basis. Although old master data and new master data are shown stored in a single data storage, it can be appreciated that the old and new data can be partially among a plurality of data storage devices. In addition, data specific to the newly migrated deployment units is replicated on the new application platform B 100B. This allows the functionality of the new application platform to be realized, i.e., operate properly. The application platform B 100B may include new data D' 104D', new data E' 104E', and new data F' 104F'. New data D' 104D' may replace data D 104D of FIG. 1A. New data E' 104E' may replace data E 104E of FIG. 1A. New data F' 104F' may replace data F 104F of FIG. 1A. The new data can communicate via messages with the data of the old application platform A 100A and vice versa, if necessary. For example, the new data D' 104D' and data B 104B of application platform A 100A can communicate with one another via messages. Similarly, any add-ons that need access to data but have yet to migrate from the old application platform A 100A to the new application platform B 100B can access new data D' 104D'. Thereby, the user still has access to all of the data and functionality of the old application platform A 100A as well as the functionality and data of the new deployment units, such as 102C', and data such as D 104D' on new application platform B 100B.

The deployment units and data may communicate via messages. Messages may be transmitted and received via an establish protocol implemented by the application platform A 100A and the application platform B 100B. The established protocol can be any one or combination of well-known data transfer protocols. Such as user datagram protocol (UDP) or transmission central protocol (TCP) or a custom protocol. For example, a message can include data type, application platform, pointers, or other variables or information necessary to communicate the necessary data from the old application platform to the new application platform.

After the application platform B 100B is installed and executed, new functionality provided by the application platform B 100B, the deployment unit C' 102C' and the deployment unit D' 102D' and any data required by the deployment units on application platform B 100B may be available to users of the enterprise. Meanwhile, customer-programmed add-on functionality provided by add-on 106 is still available.

Figure 1C:
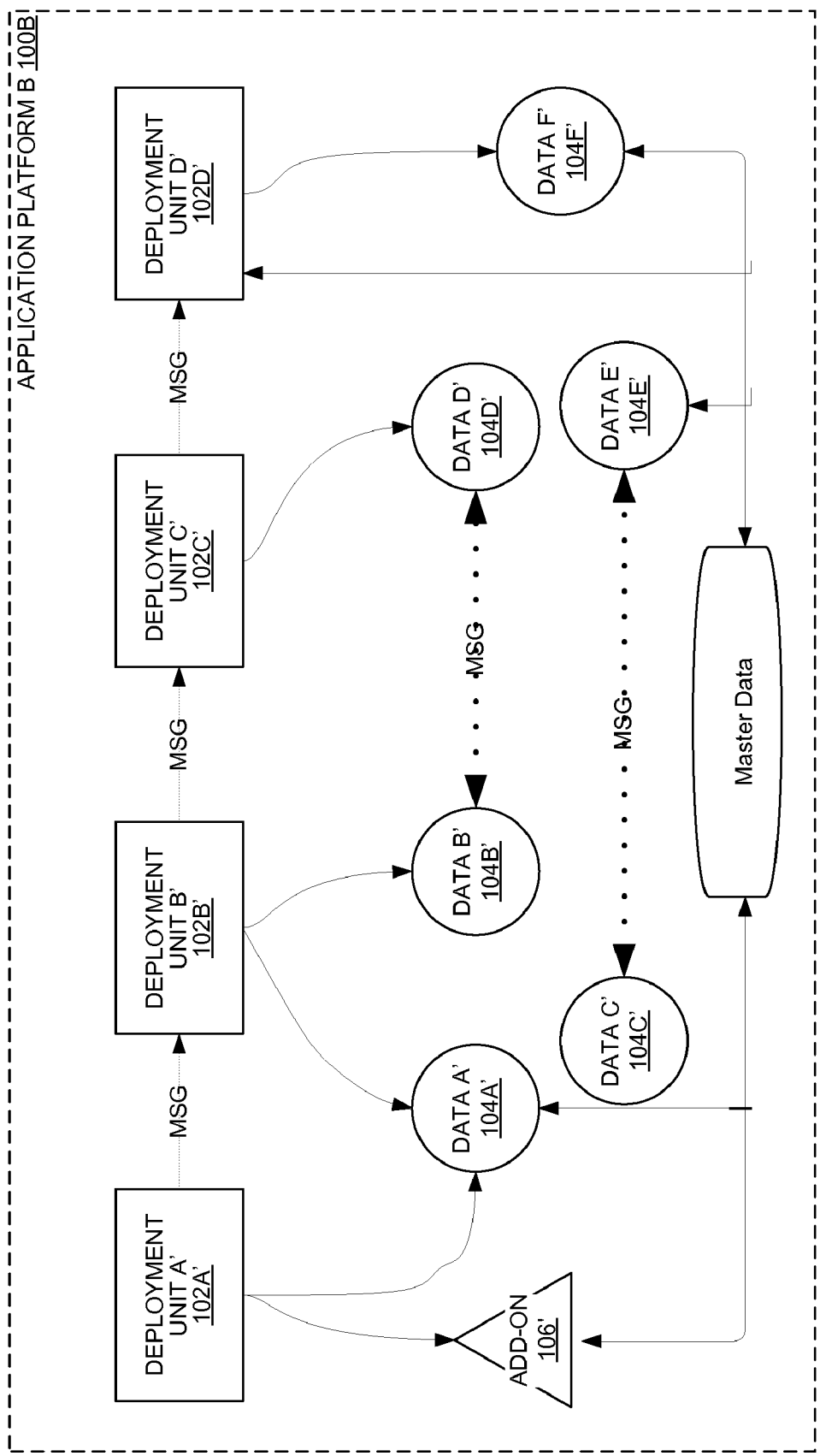
FIG. 1C depicts an example application platform after migration in accordance with an embodiment of the present invention.

FIG. 1C depicts an example application platform after migration in accordance with an embodiment of the present invention. All functionality has migrated to application platform B 100B and the application platform A 100A is no longer required or executing. Application platform B 100B is fully functional and provides all new functionality of application platform B and associated deployment units to users of the system.

The application platform B 100B may include new deployment unit A' 102A' and deployment unit B' 102B'. The deployment unit A' 102A' may replace the deployment unit A 102A of FIG. 1A and FIG. 1B and provide additional functionality and/or features. The deployment unit B' 102B' may replace the deployment unit B 102B of FIG. 1A and FIG. 1B and provide additional functionality and/or features.

The application platform B 100B may include new data A' 104A', new data B' 104B', and new data C' 104C'. New data A' 104A' may replace data A 104A of FIG. 1A and FIG. 1B. New data B' 104B' may replace data B 104B of FIG. 1A and FIG. 1B. New data C' 104C' may replace data C 104C of FIG. 1A and FIG. 1B.

The deployment units and data may continue to communicate via messages. Messages may be transmitted and received via an establish protocol implemented by the application platform A 100A and the application platform B 100B. The established protocol can be any one or combination of well-known communication protocols.

After the application platform B 100B is installed and executed, new functionality provided by the application platform B 100B, the deployment unit A' 102A' and the deployment unit B' 102B' may be available to users of the enterprise.

A new add-on 106' may be installed in application platform B 100B, replacing add-on 106 of FIG. 1A and FIG. 1B. The add-on 106' may provided the same functionality of add-on 106 of FIG. 1A and FIG. 1B, but on application platform B 100B as opposed to application platform A 100A. Alternatively, add-on 106' can provide new additional functions and/or features.

FIG. 2 depicts an exemplary system for migrating an application platform in accordance with an embodiment of the present invention. A server A 200A may execute an application platform A 202A. The application platform A 202A may be an older version or release of the application platform software.

A server B 200B may execute an application platform B 202B. The application platform B 202B may be a newer version or release of the application platform software. Application platform B 202B may include new features and other improvements over application platform A 202A.

It will be appreciated that the servers A 200A and B 200B may be separate physical boxes with separate processors memories. It will also be appreciated that the two servers may execute on two separate virtual machines on a single physical server. Alternative embodiments, such as hosting a new application platform on plural servers or consolidating an old application platform hosted on plural servers in a single server, are also possible to execute the two application platforms. It will be appreciated that it is possible to execute the two application platforms on a single server, in addition to the currently discussed embodiment.

The server A 200A may be in communication with a memory A 204A. The memory A 204A may be a rewritable, non-volatile memory for storing the deployment units and data associated with application platform A 202A. The memory may be partitioned into various data units, such as data A, data B and so on as illustrated in FIGS. 1A-1C.

Similarly, the server B 200B may be in communication with a memory B 204B via messages as previously described or by other known means. The memory B 204B may store the deployment units and data associated with application platform B 202B. The memory B 204B may store data that replicates data from memory A 204A.

The server A 200A may communicate with a terminal 208 over network A 206A. The network A 206A may be configured to carry digital communications between the server A 200A and the terminal 208. The network A 206A may carry inputs and outputs to allow a business scenario to execute on the server A 200A in conjunction with user inputs received from the terminal 208.

Similarly, the server B 200B may communicate with the terminal 208 over network B 206B. The server B 200B may communicate with the server A 200A to provide the business scenario. Deployment units of application platform B 202B may communicate with deployment units of application platform A 202A via messages through, for example, server B 200B and network 206B via server A 200A or client 208 and network A 206A, or any suitable communication path.

The terminal 208 may be accessible to a user 210. The user 210 may be an employee of the customer enterprise and assigned a job function. Part of the job function may require the user 210 to interact with the business scenario provided by the system.

The terminal may be any personal computer, mobile computing device, or any other computing device configured to receive input, provide output, and communicate over a network.

Figure 3:
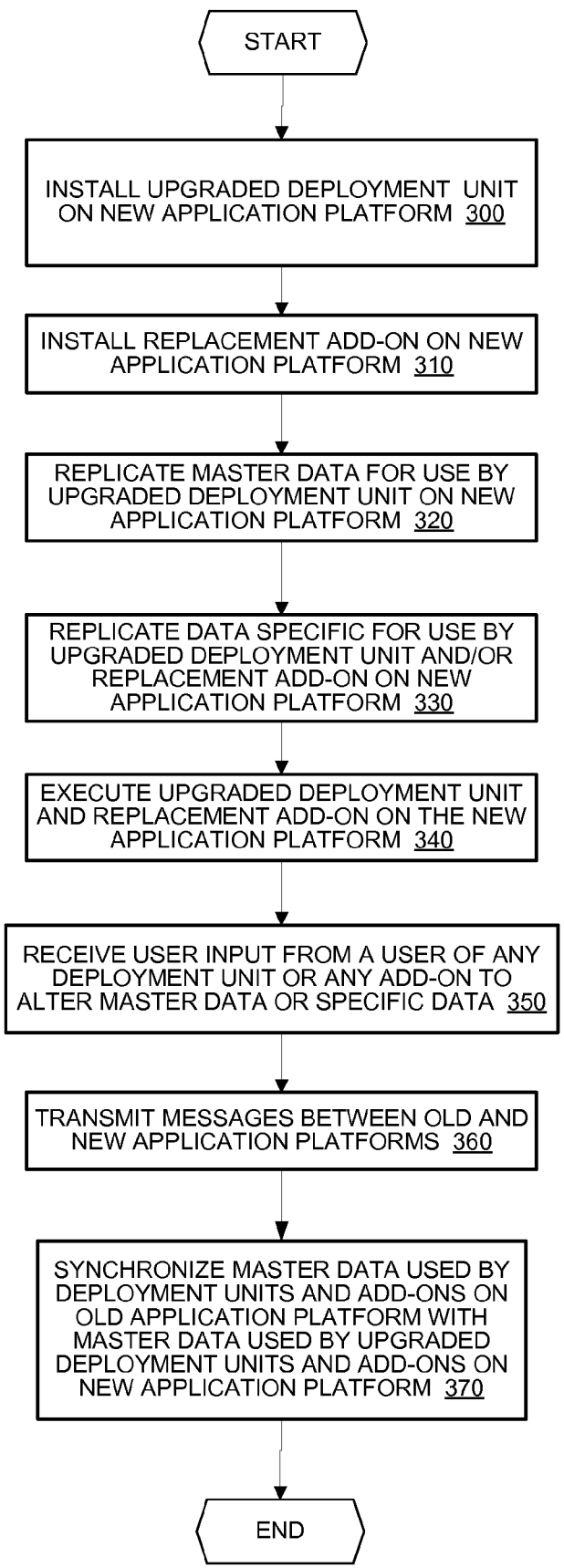
FIG. 3 depicts an example procedure for migrating an application platform in accordance with an embodiment of the present invention.

FIG. 3 depicts an example procedure for migrating a business scenario from a first application platform to another application platform in accordance with an embodiment of the present invention. The procedure may execute on a system as depicted in FIG. 2. The application platform may be configured to provide business scenarios to users within an enterprise and include a plurality of deployment units, data, and customer add-ons. When the old application platform is to be upgraded, a new release application platform may be installed on a second server. In an interim period, both an old application platform and the new application platform are executing in parallel on separate servers, exchanging data and other information necessary for properly executing the business scenario. Master data that may be required for both application platforms may be shared between the new application platform and the old application platform or replicated from the old application platform to the new application platform. In addition, the master data can be initially replicated from the old application platform to the new application platform and the old master data and the new master data is synchronized including changes made to the master data by the users on either of the old application platform and the new application platform. Alternatively, master data, e.g., all of the data necessary for the old application platform to function, is replicated in a single occurrence or incrementally on the new application platform.

In 300, the user may optionally replace a first deployment unit by installing an upgraded version of the first deployment unit. An upgraded first deployment unit may be installed on the new application platform while an old first deployment unit is uninstalled from the old application platform. Any relationships that the old first deployment unit has are transferred to the new first deployment unit. For example, the old first deployment unit may interface with other deployment units and data via messages. Such messages are still possible, but now sent to and received from the new first deployment unit. In addition, any data that is specifically used by the old deployment unit, such as data B 104B, on the old application platform will be replicated on the new application platform as illustrated by data B' 104B'. Alternatively, all of the data can be replicated at this time on the new application platform. Any data that is updated by the deployment units remaining on the old application platform may be replicated on the new application platform on a periodic basis, or some other basis, e.g., after a save, to insure proper operation of the deployment units remaining on the old application platform and the new deployment units on the new application platform. The replication of data can be accomplished using well-known data transfer processes, including copying the master data to a machine-readable media, such as a disc.

In 310, the user may optionally replace a customer add-on. A customer add-on, as discussed above, may provide customer-specific functionality and be specifically programmed to function with the old first deployment unit. Migrating the customer add-on may require updating programming code associated with the customer add-on to interact with the new application platform and deployment units. Additionally, any data that needs to be accessed by the migrated customer add-on can also be replicated on the new application platform.

Master data, as discussed above, is data that is necessary for the proper operation of the business scenario. For the upgraded deployment units to operate properly, the master data accessible by the old application platform must be replicated to a second data storage connected to the new application platform, the replication is performed at 320. This will allow the upgraded deployment units to access the master data. The deployment units and add-ons remaining on the old application platform will have access to the same master data associated with the old application platforms.

In 330, any data specific to the functioning of the upgraded deployment unit or any migrated add-ons is replicated to data storage connected to the new application platform.

In 340, the server hosting the new application platform may execute a first deployment unit. The first deployment unit may provide a range of related functionality and relate to a function within the business solution provided by the application platform as discussed above. The first deployment unit may have been installed in 300. The server may optionally execute a customer add-on. The customer add-on may provide customer-specific functionality as discussed above. The customer add-on may execute in conjunction with first deployment unit executed in 340.

In 350, the server hosting the new application platform having the upgraded deployment unit and the customer add-on may receive a user input. Alternatively, a user input to an add-on from the old application platform may alter either master data or specific data, or a user of any (unchanged or upgraded) deployment units and/or (replacement or unchanged) add-ons may desire to alter either master data or specific data. The input can be a request to perform a function such as data look-up or process a customer transaction or some other process performed by the business scenario.

In 360, the server may transmit and relay any messages. Old and new deployment units as well as data may communicate with each other via messages sent directly to each other or relayed through the server. A message protocol may be established by the application platforms for all messages sent within the system. The protocols being any well-known or suitable communication protocol. The messages can include information related to the proper functioning of the business scenario, can be used to synchronize data, request functions to be performed by deployment units, and the like. The use of messages across the boundaries of the old and new application platforms is done via interfaces in the deployment units and the data modules thereby facilitating proper functioning of the business scenario distributed between the application platforms.

Synchronization of the master data may be performed at periodic intervals or other times. The master data may also be saved at a user command, or an administrator command, on one of the data storages connected to either of the application platforms, and synchronized either immediately or at some other time.

In 370, the master data may be saved to a data storage accessible to the server hosting the new application platform with associated upgraded deployment units and customer add-ons. When the migration to the new application platform is completed all of the data from the old application platform may replicated on the new application platform including any newly added or updated data, e.g., customer addresses, account balances and the like. Alternatively, the master data may be incrementally replicated to the new application platform as new deployment units installed on the new application platform can access less than all of the master data.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

What is claimed is:

1. A method for providing a business scenario, comprising:
    executing a first deployment unit on a first application platform;
    replacing a second deployment unit on the first application platform with an upgraded second deployment unit on an upgraded second application platform;
    executing the upgraded second deployment unit;
    transmitting messages related to the business scenario over a communications link between the first deployment unit on the first application platform and the upgraded second deployment unit on the upgraded second application platform to provide the functionality of the business scenario distributed between the first application platform and the upgraded second application platform;
    replicating master data related to the business scenario from a first data storage accessible by the first deployment unit on the first application platform to a second data storage on the upgraded second application platform, wherein the second data storage is accessible by both the first deployment unit and the upgraded second deployment unit, thereby synchronizing the master data in the first data storage with the master data stored in the second data storage; and
    executing a customer add-on module on the first application platform, the customer add-on module being a customized software program that provides user-defined functionality in the business scenario and communicates with the upgraded second deployment unit via messages.

2. The method of claim 1, further comprising:
    installing and executing an upgraded first deployment unit on the upgraded second application platform to replace the first deployment unit on the first application platform; and
    installing and executing an upgraded customer add-on module on the upgraded second application platform to replace the customer add-on module on the first application platform, wherein the upgraded first deployment unit and the upgraded second application platform execute on a processor, wherein the upgraded customer add-on module communicates with the first application platform via messages.

3. The method of claim 1, wherein the first application platform executes on a first processor, and
    the upgraded second application platform executes on a second processor.

4. The method of claim 1, further comprising:
    receiving user input in the business scenario from a user terminal in communication with the first processor and the second processor.

5. Method for upgrading a business application by maintaining data integrity and application functionality across a plurality of application platforms, comprising:
    hosting a business application on a first application platform, wherein the business application comprises a plurality of deployment units, a customer add-on module, data modules and master data, the master data being stored on a first data storage device accessible by at least one deployment unit hosted on the first application platform;
    installing on a second application platform, a first upgraded deployment unit corresponding to a first deployment unit of the plurality of deployment units on the first application platform to replace the first deployment unit;
    replicating master data associated with the business application on the first application platform to a second data storage device accessible by the first upgraded deployment unit on the second application platform;
    in response to a user input to the first upgraded deployment unit, altering master data stored on the second data storage device accessible;
    communicating via communication channels between the first application platform and the second application platform messages between at least one of the plurality of deployment units on the first application platform and the first upgraded deployment unit on the second application platform; and
    in response to the communicating, synchronizing the master data stored on the first data storage device and the data stored on the second data storage device, wherein the customer add-on module is a customized software program that provides user-defined functionality in the business application and communicates with the first upgraded deployment unit via messages; and
    installing on the second application platform, a second upgraded deployment unit corresponding to a second deployment unit of the plurality of deployment units on the first application platform to replace the second deployment unit.

6. The method of claim 5, comprising:
in response to the communicating, providing functions performed by the first upgraded deployment unit on the second application platform to users connected to the first application platform.

7. The method of claim 5, further comprising:
installing and executing on the upgraded second application platform, an upgraded customer add-on module to replace the customer add-on module on the first application platform, wherein the first upgraded deployment unit and the second upgraded application platform execute on a processor and the upgraded customer add-on module communicates with the first application platform via messages.

8. A hardware system for providing a business scenario, comprising:
a first application platform executing a first deployment unit;
replacing a second deployment unit on the first application platform with an upgraded second deployment unit on an upgraded second application platform;
executing the upgraded second deployment unit;
transmitting messages related to the business scenario over a communications link between the first deployment unit on the first application platform and the upgraded second deployment unit on the upgraded second application platform to provide the functionality of the business scenario distributed between the first application platform and the upgraded second application platform;
replicating master data related to the business scenario from a first data storage accessible by the first deployment unit on the first application platform to a second data storage on the upgraded second application platform, wherein the second data storage is accessible by both the first deployment unit and the upgraded second deployment unit, thereby synchronizing the master data in the first data storage with the master data stored in the second data storage; and
a customer add-on module executing on the first deployment unit,
the customer add-on module being a customized software program that provides user-defined functionality in the business scenario and communicates with the upgraded second deployment unit via messages.

9. The hardware system of claim 8, further comprising:
an upgraded first deployment unit installed and executed on the upgraded second application platform to replace the first deployment unit on the first application platform; and
an upgraded customer add-on module executing on the upgraded first deployment unit to replace the customer add-on module; wherein the upgraded first application unit and the upgraded second application platform execute on a processor.

10. The hardware system of claim 8, wherein the first deployment unit and the upgraded second deployment unit provide functionality to execute the business scenario.

11. The hardware system of claim 8, further comprising:
a first processor executing the first application platform; and
a second processor executing the upgraded second application platform.

12. The hardware system of claim 11, further comprising:
a user terminal in communication with the first processor and the second processor, the user terminal for receiving user input in the business scenario.

13. A non-transitory computer-readable medium including instructions adapted to execute a method for providing a business scenario, the method comprising:
executing a first deployment unit on a first application platform;
replacing an original second deployment unit on the first application platform with an upgraded second deployment unit on an upgraded second application platform;
executing the upgraded second deployment unit;
transmitting messages related to the business scenario over a communications link between the first deployment unit on the first application platform and the upgraded second deployment unit on the upgraded second application platform to provide the functionality of the business scenario distributed between the first application platform and the upgraded second application platform;
replicating master data related to the business scenario from a first data storage accessible by the first deployment unit on the first application platform to a second data storage on the upgraded second application platform, wherein the second data storage is accessible by both the first deployment unit and the upgraded second deployment unit, thereby synchronizing the master data in the first data storage with the master data stored in the second data storage; and
executing a customer add-on module on the first deployment unit, the customer add-on module being a customized software program that provides user-defined functionality in the business scenario and communicates with the upgraded second deployment unit via messages.

14. The non-transitory computer-readable medium of claim 13, further comprising:
installing and executing an upgraded first deployment unit on the upgraded second application platform to replace the first deployment unit; and
installing and executing an upgraded customer add-on module on the upgraded second application platform to replace the customer add-on module on the first application platform, wherein the upgraded first application unit and the upgraded second application platform execute on a processor.

15. The non-transitory computer-readable medium of claim 13, wherein the first deployment unit and the upgraded second deployment unit provide functionality to execute the business scenario.

16. The non-transitory computer-readable medium of claim 13, wherein the application platform provides a complete business solution to a customer.

17. The non-transitory computer-readable medium of claim 13, further comprising:
receiving user input in the business scenario from a user terminal in communication with a first processor and a second processor, wherein
the first application platform executes on the first processor, and
the upgraded second application platform executes on the second processor.

* * * * *